United States Patent [19]

Maus et al.

[11] Patent Number: 5,474,746
[45] Date of Patent: Dec. 12, 1995

[54] CATALYST CARRIER BODY FOR EXHAUST SYSTEMS OF INTERNAL COMBUSTION ENGINES

[75] Inventors: Wolfgang Maus; Rolf Brück, both of Bergisch Gladbach, Germany

[73] Assignee: Emitec Gesellschaft fuer Emissionstechnologie mbH, Lohmar, Germany

[21] Appl. No.: 208,014

[22] Filed: Mar. 9, 1994

[30] Foreign Application Priority Data

Sep. 9, 1991 [DE] Germany .......................... 41 29 893.4

[51] Int. Cl.⁶ ....................................................... F01N 3/10
[52] U.S. Cl. ........................ 422/174; 422/175; 422/312; 60/299
[58] Field of Search ........................ 422/174, 171, 422/175, 180, 311, 312; 60/299, 300; 219/505, 544

[56] References Cited

U.S. PATENT DOCUMENTS

| | | | |
|---|---|---|---|
| 1,494,939 | 5/1924 | Abbott | 219/540 |
| 1,731,472 | 2/1927 | Murray . | |
| 3,243,753 | 3/1966 | Kohler | 219/505 X |
| 3,270,184 | 8/1966 | Negromanti | 219/505 X |
| 3,375,477 | 3/1968 | Kawazoe | 219/505 X |
| 4,317,367 | 3/1982 | Schonberger | 374/165 |
| 5,254,840 | 10/1993 | Thompson | 219/544 |

FOREIGN PATENT DOCUMENTS

| | | |
|---|---|---|
| 0277765 | 8/1988 | European Pat. Off. . |
| 2293846 | 7/1976 | France . |
| 2617592 | 1/1989 | France . |
| 313987 | 7/1919 | Germany . |
| 925783 | 3/1955 | Germany . |
| 2318180 | 10/1974 | Germany . |
| 2338169 | 2/1975 | Germany . |
| 2337596 | 5/1976 | Germany . |
| 2946799 | 11/1981 | Germany . |
| 205001 | 12/1983 | Germany . |
| 3346506 | 4/1985 | Germany . |
| 2760242 | 4/1989 | Germany . |
| 2905905 | 9/1989 | Germany . |
| 56-164931 | 12/1981 | Japan . |
| 817565 | 3/1981 | U.S.S.R. . |
| 89/07488 | 8/1989 | WIPO . |
| 89/10471 | 11/1989 | WIPO . |
| 90/03220 | 5/1990 | WIPO . |
| 91/14855 | 10/1991 | WIPO . |

Primary Examiner—Robert J. Warden
Assistant Examiner—Christopher Y. Kim
Attorney, Agent, or Firm—Herbert L. Lerner; Laurence A. Greenberg

[57] ABSTRACT

A catalyst carrier body for exhaust systems of internal combustion engines includes a configuration for temperature measurement and/or heating walls of the catalyst carrier body. At least two layers, namely an upper layer and a lower layer, rest predominantly tightly against one another have identically structured metal foils with a thickness of from 0.02 to 0.1 mm. At least one of the layers has an outward bulge forming at least one void along the layers and between the layers. At least one temperature sensor and/or heat conductor extends in the void and may have supply lines extending in the void.

39 Claims, 5 Drawing Sheets

CATALYST CARRIER BODY FOR EXHAUST SYSTEMS OF INTERNAL COMBUSTION ENGINES

BACKGROUND OF THE INVENTION

1. Field of the Invention

The present invention relates to a catalyst carrier body for exhaust systems of internal combustion engines, having a configuration for temperature measurement and/or heating of walls of the catalyst carrier body.

As emissions regulations for internal combustion engines, particularly in motor vehicles, become ever more stringent all over the world, catalytic converters are increasingly being used to detoxify the exhaust gases. It is generally necessary to regulate the combustion process of an engine as a function of many measured values, as well as to monitor the functional capability and status of a downstream catalytic converter and include it in the regulation as needed. In particular, that requires temperature measurements in the exhaust system and/or in the catalytic converter itself.

The basic structure of a catalytic converter is described, for instance, in International Application WO 89/07488. That publication in particularly describes a metal honeycomb body which includes many sheet-metal layers, at least some of which are structured and one or more of which are reinforced.

The sheet-metal layers include two or more identically structured sheet-metal layers resting in contact with one another.

Various versions of honeycomb bodies made up of structured sheet-metal layers, in particular alternatingly disposed smooth and corrugated sheet-metal layers, are known from International Application WO 90/03220, corresponding to U.S. Pat. No. 5,135,794. International Application WO 89/10471, corresponding to allowed U.S. Pat. No. 5,232,672 issued Jun. 21, 1994, also discloses an electrical heating configuration for such honeycomb bodies.

Finally, Published International Application PCT/EP89/00311, corresponding to U.S. Pat. No. 5,135,794, shows various options for integrating temperature sensors into a metal honeycomb body in order to measure the temperature in it directly.

One problem in measuring temperature in the exhaust gas and especially in the interior of a catalytic converter is that the exhaust gas, at temperatures that may be above 1000° C. under some circumstances, act highly corrosively, so that alloys which in principle would be well suited for temperature sensors or as heat conductors, cannot readily be used unprotected.

Another problem is that the exhaust gas flow in an exhaust system does not have a uniformly distributed profile over the cross-section of the exhaust system, so that spot measurement of temperature is generally not especially conclusive. For that reason, and as already indicated in Published International Application No. PCT/EP89/00311, corresponding to U.S. Pat. No. 5,135,794, the measurement should, if possible, be performed linearly over a representative cross-section of the exhaust system.

2. Summary of the Invention

It is accordingly an object of the invention to provide a catalyst carrier body for exhaust systems of internal combustion engines, which overcomes the hereinafore-mentioned disadvantages of the heretofore-known devices of this general type, in which a configuration for temperature measurement and/or heating can be used in particular in the interior of the catalytic converter and which permits the use of arbitrary materials without consideration of their corrosion properties.

With the foregoing and other objects in view there is provided, in accordance with the invention, a catalyst carrier body for exhaust systems of internal combustion engines having a configuration for temperature measurement and/or heating the walls of the catalyst carrier body, comprising at least two layers, namely an upper layer and a lower layer resting predominantly tightly against one another and having identically structured metal foils with a thickness of from 0.02 to 0.1 mm; at least one of the layers having an outward bulge forming at least one void along the layers and between the two layers; and at least one temperature sensor and/or heat conductor extending in the void or having supply lines extending in the void.

In such a configuration, the upper and lower layers may be formed of a high-temperature and corrosion-proof material and can protect the actual temperature sensor or its supply lines. The present invention is equally suitable for both punctiform measuring sensors, having supply lines which need to be protected, and for sensors or heat conductors that measure linearly or over a large surface area, all of which must be protected. Typically, temperature sensors include a resistor wire or resistor foil, particularly of nickel alloys. So-called jacket measuring conductors are often used, in which a resistor wire, imbedded in a layer of electrically insulating ceramic powder, is disposed in a small metal-jacketed tube. The invention is especially suited to such jacket measuring conductors, but precisely because of the presence of the protecting upper and lower layers it is also possible to embed a measuring conductor directly between electrically insulating layers. A measuring conductor may be connected by its end to the upper or lower layer, so that only one electrically conducting lead has to be laid and connected, while the other connection is made by the typically present contact of the upper and lower layers to ground. In principle, however, the invention is also suitable for two-lead or even multiple-lead configurations, in particular for conductors laid in the shape of a U in a small jacket tube.

Since very thin metal foils with a thickness of 0.02 to 0.1 mm are generally used for the upper and lower layers, it is useful to form the void in which the heat conductors, the temperature sensors and the supply lines, that are all referred to below as measuring conductors, are to be laid, by bulging out both layers, so that the necessary deformations are not overly extensive. In principle, however, it is also possible to create a void in only one of the two surrounding layers by bulging outward. The configuration according to the invention can be accommodated practically in any arbitrarily structured sheet-metal layers, but it has proved to be especially suitable if the sheet-metal layers have a corrugation in which the waves have a predetermined wave height and the measuring conductor extends approximately crosswise relative to the corrugation. In order to provide for the later buildup of a honeycomb body, it is especially advantageous if the outward bulges are constructed in such a way that they do not change the wave height but instead always contact the insides of the wave. This kind of configuration can, for instance, be produced by providing that a measuring conductor is rolled-in between two metal foils by means of two intermeshing toothed rollers, in particular with involute toothing. In this process the two rollers for producing corrugated products are provided on the outside in the circumferential direction with a groove, having a depth which is approximately equal to the diameter of the measuring conductor to be rolled. This groove means a notching-in of only those teeth of the corrugated rollers that later form the insides of the corrugation. In this way, a measuring conductor can be rolled precisely in such a way that it always extends on the inside of the corrugation and thus does not affect the wave height, so that the wave combs on both sides of the corrugation do not allow the presence of the measuring conductor to be apparent. This can play a decisive role in later processing to make a metal honeycomb body.

Although in principle it is possible to roll a measuring conductor between smooth foils as well, for example using a pair of rollers in which at least one roller includes an elastic material, nevertheless this kind of smooth sheet-metal layer cannot be arbitrarily further processed well to make a honeycomb body, since the outward bulge may under some circumstances require a corresponding groove in adjacent structured sheet-metal layers as well as a smooth sheet-metal layer with an outward bulge that is more flexionally stiff than typically smooth sheet-metal layers. In contrast thereto, a corrugated sheet-metal layer with a measuring conductor is very elastic, it cannot be distinguished from a typical corrugated sheet-metal layer by its external lines of contact, and because of the corrugation, it can receive a substantially longer temperature sensor or heat conductor than a smooth sheet-metal layer, which can markedly increase the measurement accuracy or allows arbitrary resistances on the part of the heat conductor.

In order to provide long-term stability in a corrosive medium, it may be important for the measuring conductor to in fact be accommodated in a gas-tight manner between the two layers. In order to achieve this it is useful to join the layers together in a gas-tight manner, at least at their edges, and preferably to braze them. In particular, this can be achieved by rolling a thin, for instance self-adhesive brazing foil along the edges of the layers simultaneously with the measuring conductor, so that brazing can be performed in a later production step. Naturally, the upper and lower layers may also be formed by folding only a single foil, so that then only every other edge needs to be brazed.

Particularly if the layers alone or together with other sheet-metal layers, at least some of which are structured, are formed to make a honeycomb body that has a multiplicity of channels through which a fluid can flow, in any case brazing of the sheet-metal layers takes place at the end surface later, so that by means of this process alone, brazing of both of the layers that protect the measuring conductors can already be done. Once again, however, if an additional brazing foil is rolled-in jointly, the quality and tightness can be improved. As will be described in detail below in conjunction with the drawing, it is especially advantageous if the temperature sensor configuration is used alone or together with other sheet-metal layers, at least some of which are structured, to form a honeycomb body that serves as a carrier body for catalytically active material. In that case, the temperature sensor does not measure the gas temperature in the exhaust gas of an internal combustion engine but rather directly measures the wall temperature in the catalytic converter, which increases the confidence level of the temperature measurement in terms of its functional capability.

Typically, such honeycomb bodies are surrounded by a jacket tube, through which the measuring conductor must naturally be passed. This can be done according to the invention in particular through a window, which is especially advantageous from a production standpoint. The upper and/or lower layer then has an elongated connection strap, which can be passed through the window to the outside with the measuring conductor embedded in it, without impeding any production process especially.

It should be pointed out that the configuration according to the invention, while being especially well-suited to temperature measurement or heating in a metal honeycomb body, is not limited to that application. In principle, such configurations can also be used in other locations.

Other features which are considered as characteristic for the invention are set forth in the appended claims.

Although the invention is illustrated and described herein as embodied in a catalyst carrier body for exhaust systems of internal combustion engines, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
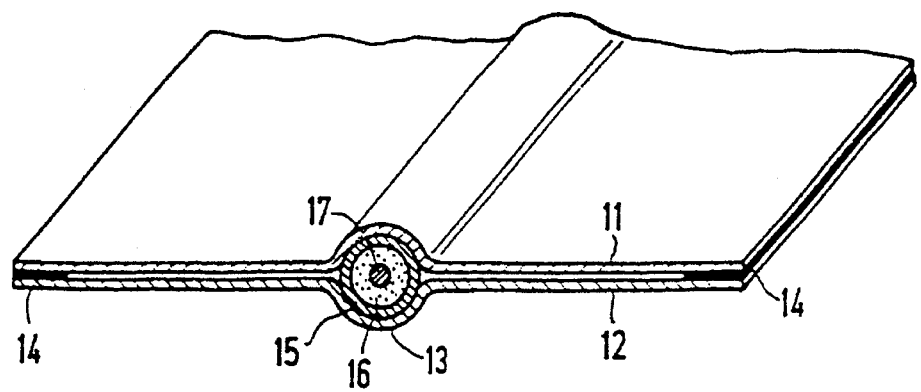
FIG. 1 is a fragmentary, diagrammatic, perspective view of a jacket measuring conductor rolled in between two smooth foils.

Referring now to the figures of the drawing in detail and first, particularly, to FIG. 1 thereof, there is seen a perspective view, cut crosswise, of a smooth upper layer 11 and a smooth lower layer 12, both of which have outward bulges 13. A jacket measuring conductor which is located in a void or hollow space formed by the outward bulges 13 includes a small metal jacket tube 15, an insulating layer 16, and a measuring conductor 17. The upper layer 11 and the lower layer 12 have edges which are joined together in gas-tight fashion by brazed connections 14, so that they completely protect the jacket measuring conductor 15, 16, 17 against corrosive gases.

Figure 2:
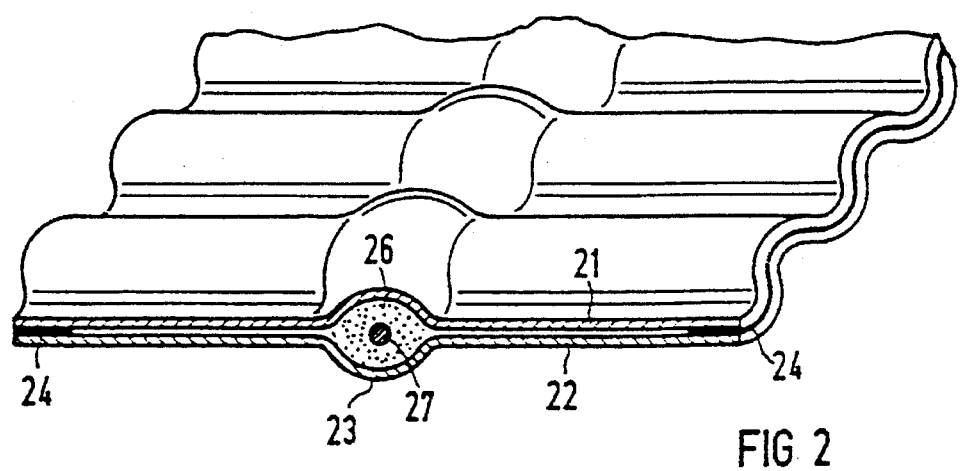
FIG. 2 is a fragmentary, perspective view of a measuring conductor rolled in between two corrugated foils.

FIG. 2 shows a corrugated upper layer 21 and a corrugated lower layer 22, which again both have outward bulges 23 that form a void or hollow space. A measuring conductor 27 is embedded in this void and is electrically insulated from the surrounding layers by an insulating layer 26. Once again, the upper layer 21 and the lower layer 22 are joined in gas-tight fashion at their edges by brazed connections 24.

Figure 3:
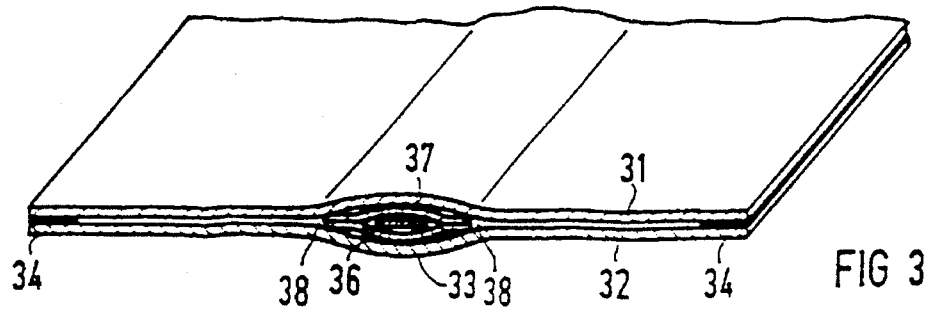
FIG. 3 is a fragmentary, perspective view of a measuring conductor foil rolled in between two smooth sheet-metal layers.

FIG. 3 shows a different variant, namely the integration of a measuring conductor foil 37 between an upper layer 31 and a lower layer 32. Outward bulges 33 with a relatively flat course in this case form a generally flat void or hollow space 38, in which the measuring conductor foil 37 is disposed and embedded between two insulating layers 36, for instance of nonwoven material. Once again, the edges are sealed off by brazed connections 34.

All of the measuring conductor configurations shown in the exemplary embodiments can be integrated into either smooth or structured sheet-metal layers. Naturally, it is also possible to accommodate two or more spaced-apart measuring conductors.

Figure 4:
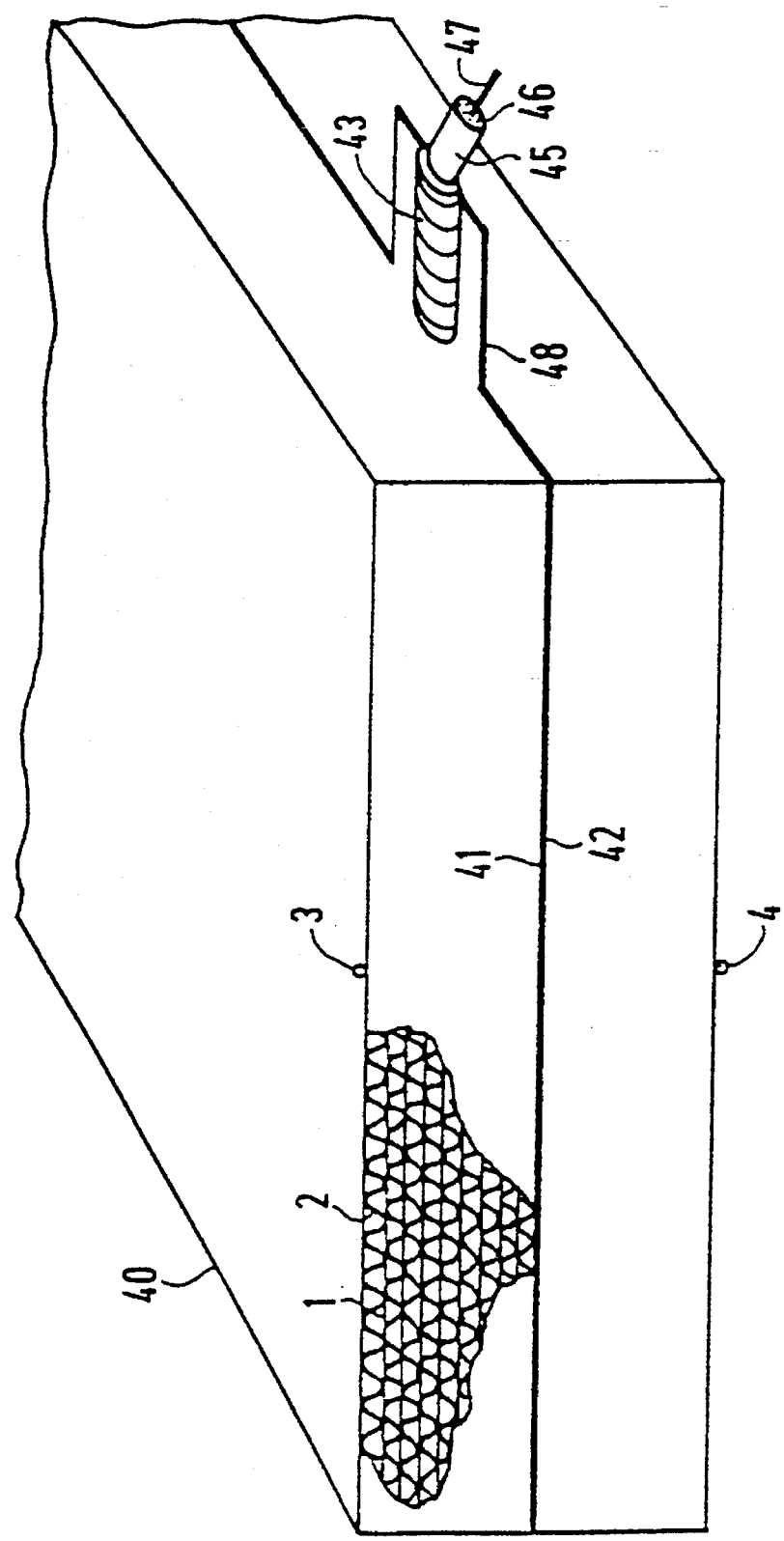
FIG. 4 is a fragmentary, perspective view of a stack of sheet-metal layers for producing a honeycomb body with a temperature sensor configuration laid between them.
Figure 5:
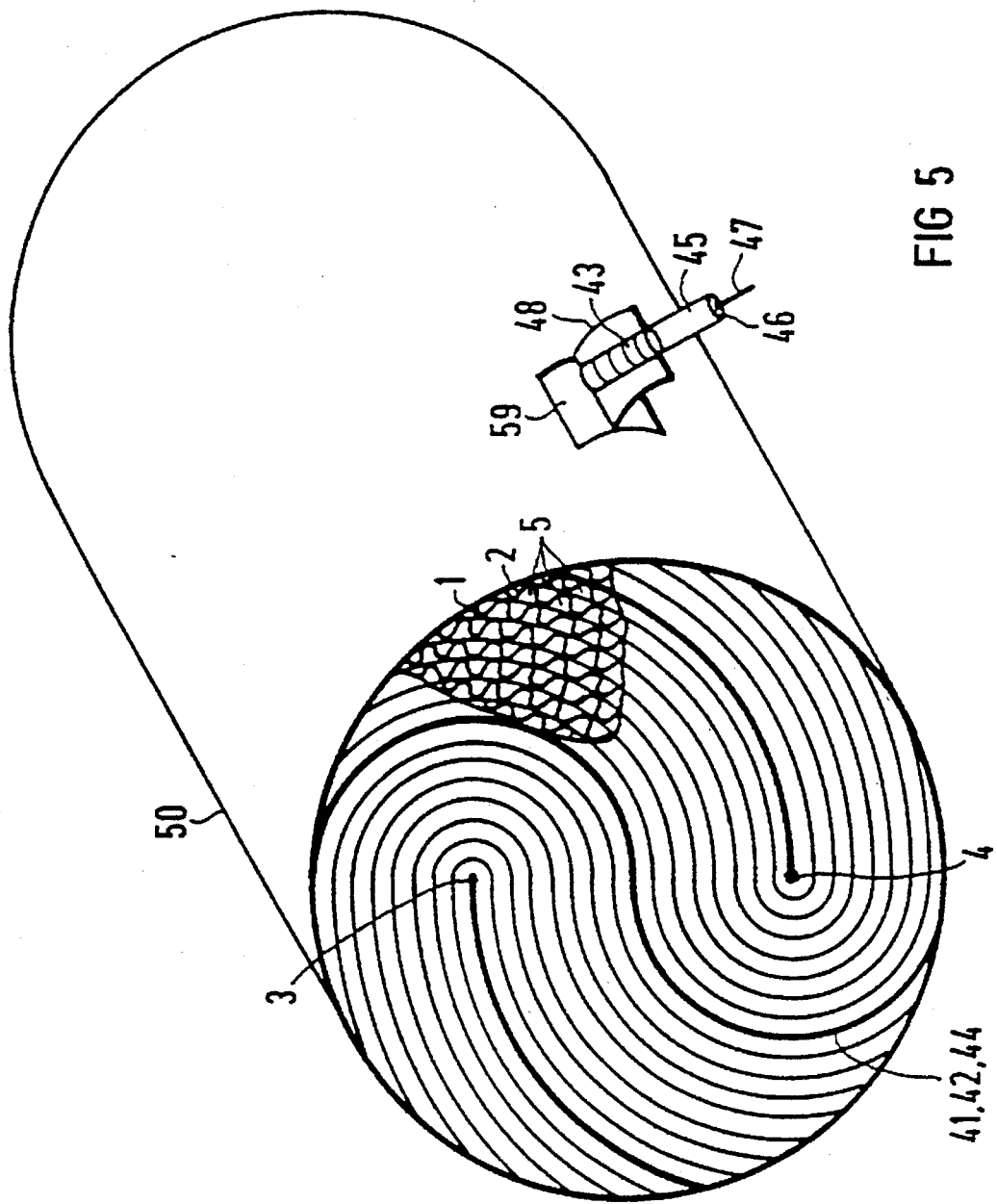
FIG. 5 is a fragmentary, perspective view of a honeycomb body made from the stack shown in FIG. 4.

As is shown in FIGS. 4 and 5, smooth or structured foils with measuring conductors embedded in them can be integrated into a production process without difficulty to produce metal catalyst carrier bodies. One such production process, which is also applicable to sheet-metal layers of differing thicknesses, has already been described in detail in International Application WO 89/07488 and the references cited therein, so that reference need be made in this case only to the particular features resulting from the presence of the temperature sensor.

FIG. 4 shows a stack of alternatingly disposed smooth sheetmetal layers 1 and corrugated sheet-metal layers 2, inside which an upper layer 41 and a lower layer 42 are located with a jacket measuring conductor 45, 46, 47 located between them. This layer has an elongated connection strap 48, which protrudes laterally out of the stack 40. The jacket measuring conductor includes a small metal jacket tube 45, an insulating layer 46 and a measuring conductor 47. The jacket measuring conductor 45, 46, 47 is also located in this connection strap 48, between outward bulges 43. For the sake of making a later connection or to accommodate a connection socket, the jacket measuring conductor in turn protrudes out of the connection strap 48.

As is known from the prior art, the entire stack 40 may be wound in opposite directions around two fixed points 3, 4 and accommodated in a jacket tube 50. By rotating the stack of sheet-metal layers 40 in the jacket tube 50, the connection strap 48 can be put into a position in which it protrudes out of a window 59 present in the jacket tube 50, as is shown in FIG. 5. The layers 1, 2 which form channels 5 are also shown. The jacket measuring conductor 45, 46, 47 is then protected up to the location where it emerges from the window 59 and for some distance beyond that location by the surrounding connection strap 48, so that a leak-proof leadthrough to the outside is reliably provided. The connection strap 48 may, for instance, be accommodated in a small brazed-on or welded-on connection tube with an adjoining connection socket, which provides a very sturdy connection capability. In the case of this configuration it does not matter whether the measuring sensor configuration includes smooth or corrugated sheet-metal layers, because this does not affect the production process. Nor does the honeycomb body differ otherwise from the known bodies in terms of its properties and its channels 5 through which a fluid can flow. Particularly when the honeycomb body is brazed at the end surface, the upper layer 41 and the lower layer 42 with a connection 44 are tightly protected against the entry of corrosive exhaust gas. This exhaust gas cannot reach the jacket measuring conductor at any point. Naturally, it is not necessary to use a jacket measuring conductor including a small metal jacket tube 45, an insulating layer 46 and a measuring conductor 47 for the above-described configuration. The variants shown in FIGS. 2 and 3 can equally be used.

Figure 6:
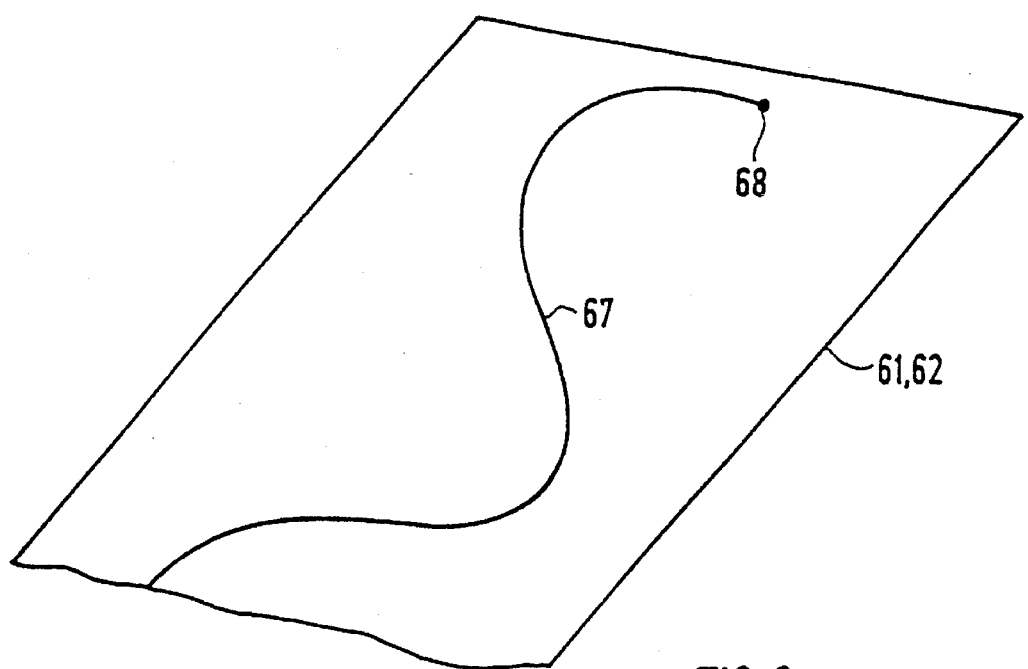
FIGS. 6 and 7 are fragmentary, perspective views of various options for a course of measuring conductors between two metal foils.

FIG. 6 diagrammatically shows that a measuring conductor or its supply line 67 need not absolutely extend in a straight line between an upper layer 61 and a lower layer 62. In principle, practically any desired course can be made possible by the rolling-in process. Even if measurement is to be performed only at a single point in punctiform fashion, the configuration according to the invention is suitable for that purpose. For instance, a thermocouple that generates a thermoelectric voltage can be disposed in a punctiform manner and connected through the measuring conductors 67. In principle it is then also possible to join the upper and lower layers at a contact point 68 to a measuring conductor made of some suitable other metal, in this way creating a thermoelectric voltage. In a configuration which is equivalent in structure, a resistor wire is connected at the contact point 68 to the upper layer 61 or the lower layer 62 acting as a ground.

Figure 7:
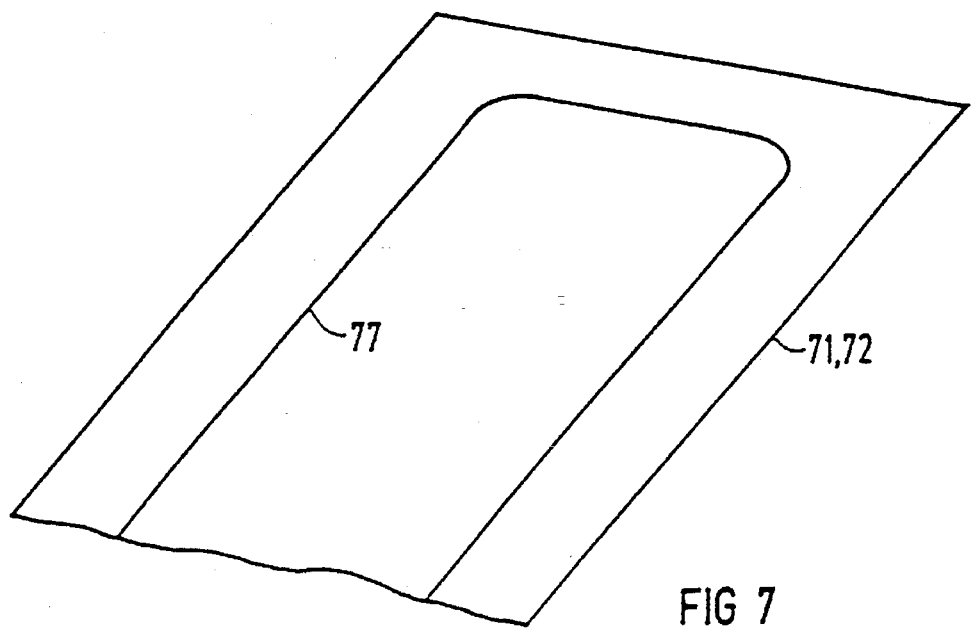

In FIG. 7, a measuring conductor 77 may naturally also be laid in a U shape between an upper layer 71 and a lower layer 72, so that its two ends can be extended to the outside at different points. This variant and many other variants can be achieved with the temperature sensor configuration of the invention. In particular, the variants described in PCT/EP89/00311, corresponding to U.S. Pat. No. 5,135,794, which is hereby entirely incorporated by reference, can be achieved, although with the limitation that it is not the gas temperature in a honeycomb body but rather preferably the wall temperature that can be measured.

Figure 8:
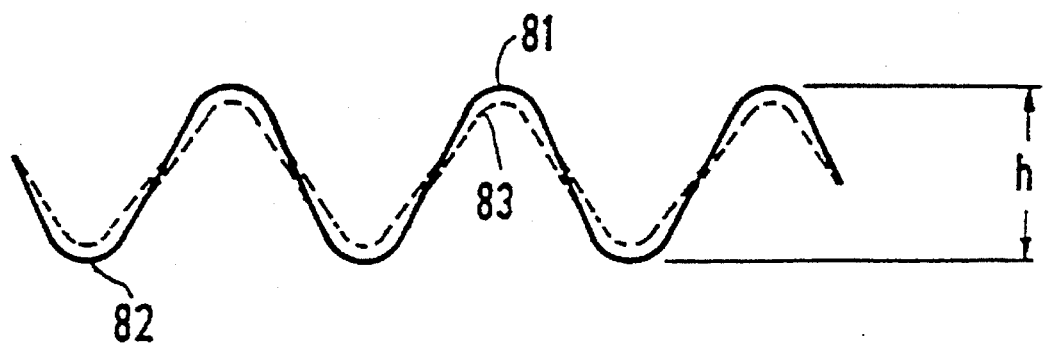
FIG. 8 is a longitudinal sectional view of a course of outward bulges in temperature sensor configurations corrugated according to the invention.

Finally, FIG. 8, again diagrammatically in a longitudinal section, shows the course of the outward bulges 83 for corrugated sheet-metal layers 81 and 82 that rest on one another and between which a non-illustrated measuring conductor is disposed. As is suggested by dashed lines, the outward bulges are always located on the inside of the corrugation, so that a wave height h is unaffected by the outward bulges. The outward bulges 83 intersect the lateral edges of the corrugation, so to speak, shifting to the inside each time.

The present invention is especially suitable for integrated temperature-monitoring of a catalytic converter, and in combination with other measuring systems it can be used especially well for emission-reducing engine control and to monitor the functional capability of the catalytic converter. Moreover, a configuration according to the invention can also be used for electric heating, for example of honeycomb bodies, especially when the heating is to be done with higher voltages and lower current intensities of 5 to 20 A, for instance.

We claim:

1. In an exhaust system of an internal combustion engine, a catalyst carrier body comprising:

a) at least an upper layer and at least a lower layer resting predominantly tightly against one another defining walls of the catalyst carrier body and having identically structured metal foils with a thickness of from 0.02 to 0.1 mm;

b) at least one of said layers having an outward bulge forming at least one void along said layers and between said layers;

c) at least one of temperature measuring means for temperature measurement having at least one temperature sensor extending into said void, or heating means for heating said walls having a heat conductor extending into said void.

2. The catalyst carrier body according to claim 1, including electrical lines extending in said void.

3. The catalyst carrier body according to claim 2, including insulating layers electrically insulating said supply lines from said upper layer and said lower layer.

4. The catalyst carrier body according to claim 2, including a jacket tube surrounding said layers and having at least one window formed therein through which said supply lines are extended to the outside.

5. The catalyst carrier body according to claim 4, wherein at least one of said layers has an elongated connection strap being extended to the outside through said window together with said supply lines embedded therein.

6. The catalyst carrier body according to claim 1, including electrical lines extending in said void.

7. The catalyst carrier body according to claim 6, including insulating layers electrically insulating said supply lines from said upper layer and said lower layer.

8. The catalyst carrier body according to claim 6, including a jacket tube surrounding said layers and having at least one window formed therein through which said supply lines are extended to the outside.

9. The catalyst carrier body according to claim 8, wherein at least one of said layers has an elongated connection strap being extended to the outside through said window together with said supply lines embedded therein.

10. The catalyst carrier body according to claim 1, wherein both said upper layer and said lower layer have outward bulges forming said void.

11. The catalyst carrier body according to claim 1, wherein said layers have a corrugation of a predetermined wave height and said temperature sensor extends approximately transversely to said corrugation.

12. The catalyst carrier body according to claim 11, wherein said outward bulge does not change the wave height and is always located on insides of a wave.

13. The catalyst carrier body according to claim 1, wherein said layers have a corrugation of a predetermined wave height and said heat conductor extends approximately transversely to said corrugation.

14. The catalyst carrier body according to claim 13, wherein said outward bulge does not change the wave height and is always located on insides of a wave.

15. The catalyst carrier body according to claim 1, wherein said temperature sensor is rolled-in between two of said metal foils.

16. The catalyst carrier body according to claim 1, wherein said heat conductor is rolled-in between two of said metal foils.

17. The catalyst carrier body according to claim 1, wherein said temperature sensor is a generally flat conductor.

18. The catalyst carrier body according to claim 1, wherein said temperature sensor is a linear conductor.

19. The catalyst carrier body according to claim 1, wherein said temperature sensor is a resistor wire.

20. The catalyst carrier body according to claim 1, wherein said temperature sensor is a resistor foil.

21. The catalyst carrier body according to claim 1, wherein said heat conductor is a generally flat conductor.

22. The catalyst carrier body according to claim 1, wherein said heat conductor is a linear conductor.

23. The catalyst carrier body according to claim 1, wherein said heat conductor is a resistor wire.

24. The catalyst carrier body according to claim 1, wherein said heat conductor is a resistor foil.

25. The catalyst carrier body according to claim 1, wherein said sensor has an end being electrically conductively connected at a contact point to at least one of said upper and lower layers.

26. The catalyst carrier body according to claim 1, wherein said heat conductor has an end being electrically conductively connected at a contact point to at least one of said upper and lower layers.

27. The catalyst carrier body according to claim 1, wherein said sensor is a jacket measuring conductor.

28. The catalyst carrier body according to claim 1, wherein said sensor is a single point measuring sensor having supply lines extending between said layers.

29. The catalyst carrier body according to claim 28, wherein said single paint measuring sensor is a thermocouple.

30. The catalyst carrier body according to claim 1, wherein said layers have edges and are gas-tightly joined together at least at said edges.

31. The catalyst carrier body according to claim 30, wherein said layers are brazed together at least at said edges.

32. The catalyst carrier body according to claim 1, including insulating layers electrically insulating said sensor from said upper layer and said lower layer.

33. The catalyst carrier body according to claim 1, including insulating layers electrically insulating said heat conductor from said upper layer and said lower layer.

34. The catalyst carrier body according to claim 1, wherein said layers are formed of high-temperature corrosion-proof steel.

35. The catalyst carrier body according to claim 34, wherein said steel is an alloy of a metal selected from the group consisting of iron, chromium and aluminum.

36. The catalyst carrier body according to claim 1, including a jacket tube surrounding said layers and having at least one window formed therein through which said temperature sensor is extended to the outside.

37. The catalyst carrier body according to claim 36, wherein at least one of said layers has an elongated connection strap being extended to the outside through said window together with said temperature sensor embedded therein.

38. The catalyst carrier body according to claim 1, including a jacket tube surrounding said layers and having at least one window formed therein through which said heat conductor is extended to the outside.

39. The catalyst carrier body according to claim 38, wherein at least one of said layers has an elongated connection strap being extended to the outside through said window together with said heat conductor embedded therein.

* * * * *

UNITED STATES PATENT AND TRADEMARK OFFICE
CERTIFICATE OF CORRECTION

PATENT NO : 5,474,746

DATED : Dec. 12, 1995

INVENTOR(S) : Maus et al.

It is certified that error appears in the above-identified patent and that said Letters Patent are hereby corrected as shown below:

Col. 6, line 61, after "layers" insert --and--.

Col. 7, lines 13-25, delete "6. The catalyst carrier body according to claim 1, including electrical lines extending in said void.
7. The catalyst carrier body according to claim 6, including insulating layers electrically insulating said supply lines from said upper layer and said lower layer.
8. The catalyst carrier body according to claim 6, including a jacket tube surrounding said layers and having at least one window formed therein through which said supply lines are extended to the outside.
9. The catalyst carrier body according to claim 8, wherein at least one of said layers has an elongated connection strap being extended to the outside through said window together with said supply lines embedded therein.";

line 26, change "10" to --6--;

line 29, change "11" to --7--;

line 33, change "12" to --8--;

line 33, change "11" to --7--;

line 36, change "13" to --9--;

UNITED STATES PATENT AND TRADEMARK OFFICE
CERTIFICATE OF CORRECTION

PATENT NO : 5,474,746
DATED : Dec. 12, 1995
INVENTOR(S) : Maus et al.

It is certified that error appears in the above-identified patent and that said Letters Patent are hereby corrected as shown below:

Col. 7, line 40, change "14" to --10--;

line 40, change "13" to --9--;

line 43, change "15" to --11--;

line 46, change "16" to --12--;

line 49, change "17" to --13--;

line 52, change "18" to --14--;

line 54, change "19" to --15--;

line 56, change "20" to --16--; and line 58, change "21" to --17--.

Col. 8, line 1, change "22" to --18--;

line 3, change "23" to --19--;

line 5, change "24" to --20--;

UNITED STATES PATENT AND TRADEMARK OFFICE
CERTIFICATE OF CORRECTION

PATENT NO : 5,474,746
DATED : Dec. 12, 1995
INVENTOR(S) : Maus et al.

It is certified that error appears in the above-identified patent and that said Letters Patent are hereby corrected as shown below:

col. 8, line 7, change "25" to --21--;

line 11, change "26" to --22--;

line 15, change "27" to --23--;

line 17, change "28" to --24--;

line 20, change "29" to --25--;

line 20, change "28" to --24--;

line 23, change "30" to --26--;

line 26, change "31" to --27--;

line 26, change "30" to --26--;

line 28, change "32" to --28--;

line 31, change "33" to --29--;

line 34, change "34" to --30--;

UNITED STATES PATENT AND TRADEMARK OFFICE
CERTIFICATE OF CORRECTION

PATENT NO. : 5,474,746
DATED : Dec. 12, 1995
INVENTOR(S) : Maus et al.

It is certified that error appears in the above-indentified patent and that said Letters Patent is hereby corrected as shown below:

col. 8, line 53, change "38" to --34--.

UNITED STATES PATENT AND TRADEMARK OFFICE
CERTIFICATE OF CORRECTION

PATENT NO : 5,474,746
DATED : Dec. 12, 1995
INVENTOR(S) : Maus et al.

It is certified that error appears in the above-identified patent and that said Letters Patent are hereby corrected as shown below:

col. 8, line 37, change "35" to --31--;

line 37, change "34" to --30--;

line 40, change "36" to --32--;

line 44, change "37" to --33--;

line 44, change "36" to --32--;

line 49, change "38" to --34--;

line 53, change "39" to --35--; and

Signed and Sealed this

Twenty-fourth Day of April, 2001

Attest:

NICHOLAS P. GODICI

Attesting Officer

Acting Director of the United States Patent and Trademark Office